UNITED STATES PATENT OFFICE.

JEAN WICKERSHEIMER, OF BERLIN, GERMANY.

PRESERVING COMPOUND.

SPECIFICATION forming part of Letters Patent No. 236,521, dated January 11, 1881.

Application filed April 10, 1880. (Specimens.)

*To all whom it may concern:*

Be it known that I, JEAN WICKERSHEIMER, of the city of Berlin, in the Kingdom of Prussia and German Empire, have invented new and useful Compounds, the composition of which and the manner to use them are fully described and set forth in the following specification.

The invention relates to that class of compounds used to preserve meat which may be intended for nutriment; and its object is, in the first case, to keep such meat in a fresh state for a certain time, so that after the expiration of one to about eight weeks, and more, it may be used as healthy human food in any of the usual forms.

For meat intended to serve as food I prepare my compound as follows: I dissolve over fire, in three liters of water, thirty-six grams of potash, fifteen grams of common salt, and sixty grams of alum; cool down and filter. The result is a mixture, *a*. Then I prepare the mixture *b* by dissolving nine grams of salicylic acid in forty-five grams of methyl-alcohol, adding thereto two hundred and fifty grams of glycerine. Uniting to the mixture *a*, heated to 50° Celsius, the mixture *b*, I obtain my preserving compound. Here it must be remarked that to get to a satisfactory result the ingredients should be chemically pure and of the best quality, but that chemically equivalent acting substances may be substituted for one or the other of the ingredients, and that the figures given above are taken in the average, so as to allow a little play to one side or the other. This compound will do very well to keep any kind of meat, as beef, mutton, swine, goose, &c., in a perfect state for two to three weeks. Should it be desired to preserve it for a longer period, then the quantity of methyl-alcohol in the compound should be augmented, without, however, to exceed twenty grams per liter. Also should be taken, instead of nine grams of salicylic acid, up to twelve grams, and instead of two hundred and fifty grams of glycerine, up to four hundred and fifty grams. I recommend, for the preservation of swine, to the compound the addition of two to three grams of saltpeter, because the color of the meat will then remain a more agreeable one.

The manner to use my compound for the preservation of meat consists in introducing it into and throughout the body of the animal prior to or shortly after killing it, but always before it is opened for evisceration.

The proportions first given are those which answer in ordinary cases, and are generally preferred. This compound, like any other, whether used for preserving or in any other capacity, is subject to variations in proportions, according to the varying circumstances under which it is used or the subjects it is expected to treat, while it preserves still its identity as a compound, and in view of this the above changes are suggested.

The introduction of the compound is effected, when undertaken before the killing, and on smaller animals, fish, birds, &c., directly into the heart. A sharp-pointed mouth-piece of a syringe (a Pravatz syringe or any other suitable one) is thrust into the heart of the animal—in birds between the bifurcated bone, and in fish between the breast-fins in an oblique direction—and the compound forced into it. The quantity of the injected fluid varies in proportion to the volume of the animal, but is about one hundred grams on one kilogram of body-weight. On larger animals—cattle, beef, swine, &c.—the injection of the compound is effected into the large arteries of the neck just after killing the animal. The syringe possesses for that purpose a blunt smooth mouth-piece, which is introduced into the incised large artery of one side of the neck in a direction from head to foot, and tied up to it by means of a string or in any suitable way. When the artery of the other side of the neck is cut through it must be tied up.

It is not unknown to me that there are in use for similar purposes some compounds; but they differ as well in their composition as in the effect produced.

I claim—

A compound to preserve meat intended for food, consisting of salicylic acid, methyl-alcohol, and glycerine, and a solution of mineral antiseptics, consisting of potash, common salt, and alum, alum being the chief ingredient, substantially as described, and in the proportions specified.

This specification signed by me this 4th day of March, 1880.

JEAN WICKERSHEIMER.

Witnesses:
CARL T. BURCHARDT,
BERTHOLD ROI.